US012645745B2

(12) United States Patent
Sangode et al.

(10) Patent No.: US 12,645,745 B2
(45) Date of Patent: *Jun. 2, 2026

(54) SYSTEM AND METHOD FOR GENERATING RECOMMENDATIONS WITH COLD STARTS

(71) Applicant: Morgan Stanley Services Group Inc., New York, NY (US)

(72) Inventors: Asit Sangode, Livingston, NJ (US); Nora Barry, Hoboken, NJ (US); Yixin Hu, Queens, NY (US); Marcus Fontaine, Jersey City, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/673,439

(22) Filed: May 24, 2024

(65) Prior Publication Data

US 2025/0094510 A1     Mar. 20, 2025

Related U.S. Application Data

(63) Continuation of application No. 18/467,875, filed on Sep. 15, 2023, now Pat. No. 12,026,213.

(51) Int. Cl.
| | |
|---|---|
| *G06F 16/9535* | (2019.01) |
| *G06F 16/9538* | (2019.01) |
| *G06N 3/0464* | (2023.01) |
| *G06N 3/09* | (2023.01) |

(52) U.S. Cl.
CPC ...... *G06F 16/9535* (2019.01); *G06F 16/9538* (2019.01); *G06N 3/0464* (2023.01); *G06N 3/09* (2023.01)

(58) Field of Classification Search
CPC .. G06F 16/9535; G06F 16/9538; G06F 16/41; G06F 18/22; G06F 16/245; G06F 16/313; G06F 16/3346; G06N 3/09; G06N 3/0464
USPC ......................................................... 707/722
See application file for complete search history.

(56) References Cited

U.S. PATENT DOCUMENTS

| | | | |
|---|---|---|---|
| 9,336,315 | B2 | 5/2016 | Ovsjanikovs et al. |
| 11,157,954 | B1 | 10/2021 | Belanger et al. |
| 11,282,609 | B1 | 3/2022 | Gorman et al. |
| 11,397,897 | B2 | 7/2022 | Ameri |
| 2003/0217052 | A1 | 11/2003 | Rubenczyk et al. |
| 2009/0164408 | A1 | 6/2009 | Grigorik et al. |

(Continued)

*Primary Examiner* — Evan Aspinwall
(74) *Attorney, Agent, or Firm* — Leason Ellis LLP

(57) ABSTRACT

A system and method generate recommendations with cold starts. The system comprises a hardware-based processor, a memory, and a set of modules. The memory stores item taxonomy data for at least one item, stores client descriptive data for at least one client, and stores historical response data for at least one item responded to by the at least one client. The set of modules includes a machine learning module and a recommendation module. The machine learning module generates a response probability matrix using the historical response data, the item taxonomy data, and the client descriptive data. The recommendation module generates and outputs a recommendation corresponding to input data using the information deduced in the response probability matrix. The method implements the system.

20 Claims, 14 Drawing Sheets

(56) References Cited

U.S. PATENT DOCUMENTS

| | | | |
|---|---|---|---|
| 2009/0313193 A1 | 12/2009 | Hawkins et al. | |
| 2010/0070448 A1 | 3/2010 | Omoigui | |
| 2012/0102050 A1 | 4/2012 | Button et al. | |
| 2013/0124449 A1* | 5/2013 | Pinckney | G06N 20/00 |
| | | | 706/52 |
| 2014/0180826 A1 | 6/2014 | Boal | |
| 2014/0244361 A1 | 8/2014 | Zhang et al. | |
| 2016/0012106 A1 | 1/2016 | Franceschini et al. | |
| 2016/0092781 A1* | 3/2016 | Byrnes | G06Q 30/0631 |
| | | | 706/52 |
| 2016/0162975 A1* | 6/2016 | Chen | G06Q 30/0631 |
| | | | 705/26.7 |
| 2017/0098236 A1 | 4/2017 | Lee et al. | |
| 2017/0154356 A1 | 6/2017 | Trevisiol et al. | |
| 2017/0272525 A1* | 9/2017 | Bhagwan | H04L 51/18 |
| 2019/0108571 A1 | 4/2019 | Kar et al. | |
| 2019/0205939 A1 | 7/2019 | Lal et al. | |
| 2019/0279231 A1* | 9/2019 | Ning | G06Q 30/0202 |
| 2019/0378149 A1* | 12/2019 | Gao | G06Q 10/0637 |
| 2020/0387988 A1 | 12/2020 | Gelda et al. | |
| 2020/0402015 A1 | 12/2020 | Ozcaglar et al. | |
| 2022/0012268 A1 | 1/2022 | Ghoshal et al. | |
| 2022/0245702 A1* | 8/2022 | Sundaresan | G06N 7/01 |
| 2022/0292999 A1 | 9/2022 | Kratzer et al. | |
| 2022/0309117 A1 | 9/2022 | Portman et al. | |

* cited by examiner

CLIENT DESCRIPTIVE DATABASE

314

Client Feature 1 — 700

Client Feature 2 — 702

Client Feature 3 — 704

...

Client Feature N — 706

320

| CLIENT\ITEM | A | B | C | D |
|---|---|---|---|---|
| Client 1 | 0.97 | 0.10 | 0.90 | 0.05 |
| Client 2 | 0.77 | 0.11 | 0.91 | 0.84 |
| Client 3 | 0.16 | 0.94 | 0.33 | 0.09 |
| Client 4 | 0.93 | 0.14 | 0.87 | 0.79 |

| ITEM TAXONOMY/ITEM | EXISTING ITEM | NEW ITEM |
|---|---|---|
| Item Feature 1 | ABC | ABC |
| Item Feature 2 | XYZ | VWX |
| Item Feature 3 | JKL | KLM |

1000
1008
1010
1002
1004
1006

| CLIENT DATA\CLIENT | EXISTING CLIENT | | NEW CLIENT |
|---|---|---|---|
| Client Feature 1 | 5000 | ↕ | 7000 |
| Client Feature 2 | 5 | ↕ | 7 |
| Client Feature 3 | 6 | ↕ | 3.5 |

FIG. 12

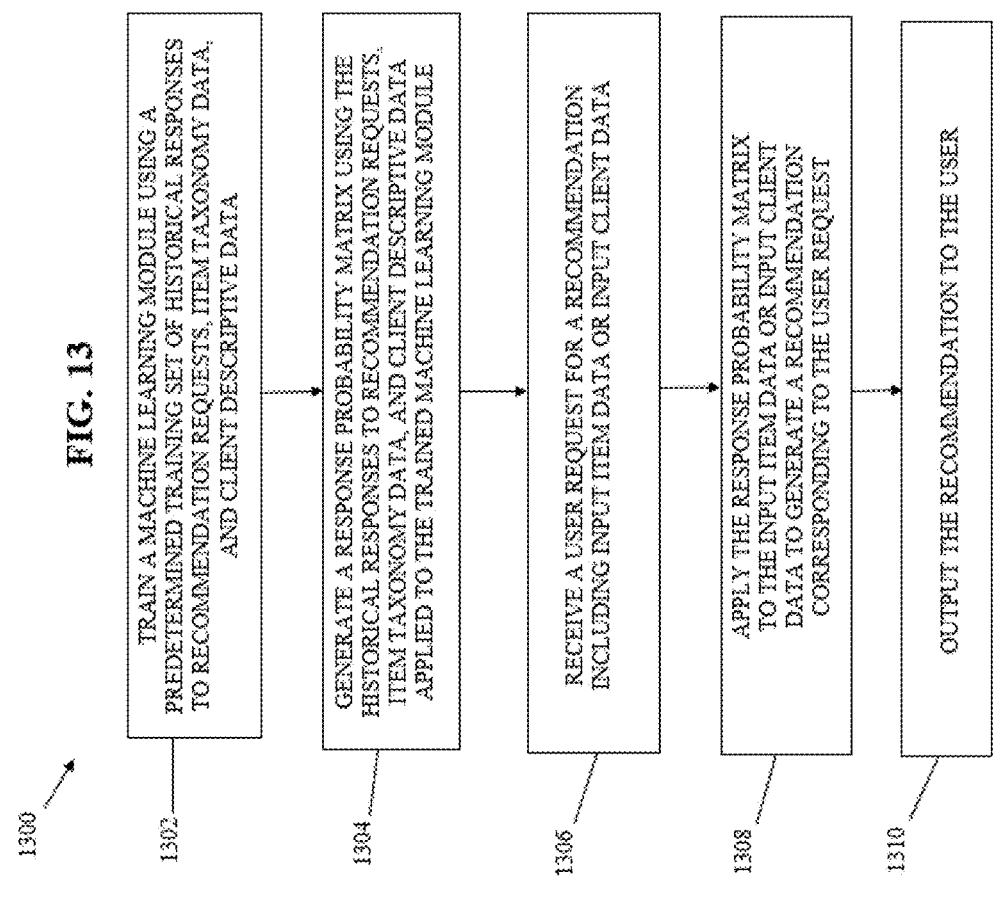

1302 — TRAIN A MACHINE LEARNING MODULE USING A PREDETERMINED TRAINING SET OF HISTORICAL RESPONSES TO RECOMMENDATION REQUESTS, ITEM TAXONOMY DATA, AND CLIENT DESCRIPTIVE DATA

1304 — GENERATE A RESPONSE PROBABILITY MATRIX USING THE HISTORICAL RESPONSES TO RECOMMENDATION REQUESTS, ITEM TAXONOMY DATA, AND CLIENT DESCRIPTIVE DATA APPLIED TO THE TRAINED MACHINE LEARNING MODULE

1306 — RECEIVE A USER REQUEST FOR A RECOMMENDATION INCLUDING INPUT ITEM DATA OR INPUT CLIENT DATA

1308 — APPLY THE RESPONSE PROBABILITY MATRIX TO THE INPUT ITEM DATA OR INPUT CLIENT DATA TO GENERATE A RECOMMENDATION CORRESPONDING TO THE USER REQUEST

1310 — OUTPUT THE RECOMMENDATION TO THE USER

SYSTEM AND METHOD FOR GENERATING RECOMMENDATIONS WITH COLD STARTS

CROSS-REFERENCE TO RELATED APPLICATION

This application is a continuation of U.S. patent application Ser. No. 18/467,875, filed Sep. 15, 2023, which is incorporated herein by reference in its entirety.

FIELD OF THE DISCLOSURE

The present disclosure relates generally to recommendation systems, and, more particularly, to a system and method configured to generate recommendations with cold starts.

BACKGROUND OF THE DISCLOSURE

Recommendation systems employ models, algorithms, and procedures to generate recommendations of items to users based on past interaction of clients with items, such as products, data, ideas, and processes. A client includes a user, a consumer, or a buyer for an organization. For example, AMAZON and NETFLIX provide recommendations of products or movies, respectively, to clients based on past interactions of the clients selecting products or movies, respectively. Recommendation systems also utilize client characteristics, such as demographics, preferences, and responsiveness of a client to marketing campaigns to present relevant items that are of interest to the client.

The "cold start" problem is a well-known problem for known recommendation systems in which attempts are made to generate a recommendation where there is insufficient previous information about the client, items, or interactions between clients and items. That is, the recommendation system has to "start cold" from the insufficient information. For example, during operation, a known recommendation system encounters a new client or a new item from which an attempt is made to generate a recommendation. However, the lack of previous information about the new client, the new item, or interactions between any of the clients and items, old and new, prevents known recommendation systems from generating recommendations, or from generating relevant recommendations pertaining to the new client or the new item.

FIG. 1 illustrates a recommendation system 100 in the prior art. The recommendation system 100 includes a recommendation module 102 operatively connected to a historical response database 104 storing historical responses 106 for clients 108, 110, 112 in relation to items 114, 116, 118, such as data, ideas, and processes. Using such historical responses 106, the recommendation module 102 generates and outputs a recommendation 120. However, upon introduction of a new client 122, there are no historical responses for the new client 122, and so the recommendation 120 cannot be generated for the new client 122, and cannot apply to the new client 122.

FIG. 2 illustrates an alternative recommendation system 200 in the prior art. The recommendation system 200 includes a recommendation module 202 operatively connected to a historical response database 204 storing historical responses 206 for clients 208, 210, 212 in relation to items 214, 216, 218, such as data, ideas, and processes. Using such historical responses 206, the recommendation module 202 generates and outputs a recommendation 220. However, upon introduction of a new item 222, there are no historical presentations or responses for the new item 222, and so the recommendation 220 cannot be generated for the new item 222, and cannot apply to the new item 222.

Due to the cold start problem, known recommendation systems are not effective or capable of generating recommendations for new clients or with regard to new items.

SUMMARY OF THE DISCLOSURE

According to an embodiment consistent with the present disclosure, a system and method are configured to generate recommendations with cold starts.

In an embodiment, a recommendation system comprises a hardware-based processor, a memory, and a set of modules. The memory is configured to store instructions, is configured to provide the instructions to the hardware-based processor, and is configured to store item taxonomy data for at least one item, to store client descriptive data for at least one client, and to store historical response data for at least one item responded to by the at least one client. The set of modules is configured to implement the instructions provided to the hardware-based processor. The set of modules includes a machine learning module and a recommendation module. The machine learning module is configured to generate a response probability matrix using the historical response data, the item taxonomy data, and the client descriptive data. The recommendation module is configured to generate and output a recommendation corresponding to input data using the response probability matrix.

The input data can include client data or item data. The item data can be selected from the group consisting of: a numerical value, an idea, a process, a product, a service, an application, and a financial value. The machine learning module can include a neural network. The neural network can be a deep neural network including a plurality of nodes arranged in a plurality of layers of nodes. The neural network can be trained from a training set including the historical response data, the item taxonomy data, the client descriptive data, and probabilities as target outputs associated with the historical response data, the item taxonomy data, and the client descriptive data. The response probability matrix can include a probability of a response of the at least one client to the at least one item. The at least one client can be a new client. The at least one item can be a new item.

In another embodiment, a recommendation system comprises an input device, a hardware-based processor, a memory, and a set of modules. The input device is configured to receive input data. The memory is configured to store instructions and configured to provide the instructions to the hardware-based processor, and configured to store item taxonomy data for at least one item, to store client descriptive data for at least one client, and to store historical response data for at least one item responded to by the at least one client. The set of modules is configured to implement the instructions provided to the hardware-based processor. The set of modules includes a trained machine learning module and a recommendation module. The trained machine learning module is configured to generate a response probability matrix using the historical response data, the item taxonomy data, and the client descriptive data. The recommendation module is configured to generate and output a recommendation corresponding to the input data using the response probability matrix.

The input data can include client data or item data. The item data can be selected from the group consisting of: a numerical value, an idea, a process, a product, a service, an application, and a financial value. The machine learning module can include a neural network. The neural network ca be a deep neural network including a plurality of nodes arranged in a plurality of layers of nodes. The neural network can be trained from a training set including the historical response data, the item taxonomy data, the client descriptive data, and probabilities as target outputs associated with the historical response data, the item taxonomy data, and the client descriptive data. The response probability matrix can include a probability of a response of the at least one client to the at least one item. The at least one client can be a new client. The at least one item can be a new item.

In a further embodiment, a method comprises providing a trained machine learning module and a recommendation module, and storing item taxonomy data for at least one item, client descriptive data for at least one client, and historical response data for the at least one item responded to by the at least one client. The method further comprises generating a response probability matrix by the trained machine learning module using the historical response data, the item taxonomy data, and the client descriptive data, wherein the response probability matrix includes a probability of a response of the at least one client, including a new client, to the at least one item, including a new item. The method also comprises receiving a recommendation request including input data, wherein the input data includes client data or item data. In addition, the method comprises generating a recommendation corresponding to the input data using the response probability matrix, and outputting the recommendation. The machine learning module can be trained from a training set including the historical response data, the item taxonomy data, the client descriptive data, and probabilities as target outputs associated with the historical response data, the item taxonomy data, and the client descriptive data.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

FIG. 12 is a relational diagram of similarities.

FIG. 13 is a flowchart of operation of the recommendation system of FIG. 3.

It is noted that the drawings are illustrative and are not necessarily to scale.

DETAILED DESCRIPTION OF CERTAIN EMBODIMENTS OF THE DISCLOSURE

Example embodiments consistent with the teachings included in the present disclosure are directed to a recommendation system 300 and method 1300 configured to generate recommendations with cold starts.

Figure 3:
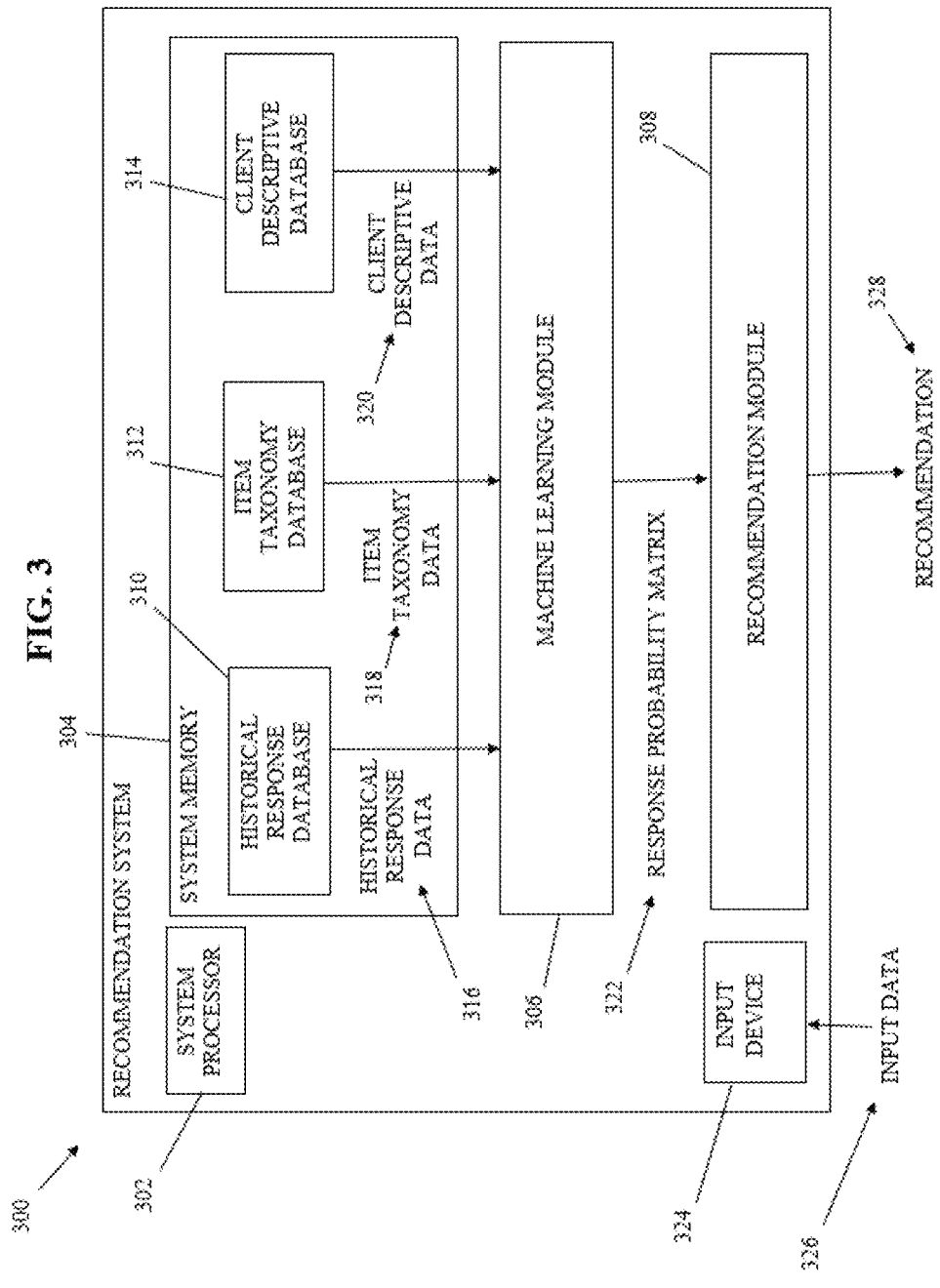
FIG. 3 is a schematic of recommendation system, according to an embodiment.

As shown in FIG. 3, the recommendation system 300 includes a system processor 302, a system memory 304, a machine learning module 306, and a recommendation module 308. The system memory 304 further includes a historical response database 310, an item taxonomy database 312, and a client descriptive database 314. The historical response database 310 is configured to store historical response data 316 for clients and items, as described below. The historical response data 316 includes responses of a recommendation module, such as the recommendation module 308, to recommendation requests submitted by a user in regard to an item. In one embodiment, the historical response data 316 includes associations or pairings of different clients with different items. For example, such associations or pairings of different clients with different items represent historical interactions between different clients and different items. The item taxonomy database 312 is configured to store item taxonomy data 318, as described below. The client descriptive database 314 is configured to store client descriptive data 320, as described below. Each of the historical response data 316, the item taxonomy data 318, and the client descriptive data 320 is loaded into the historical response database 310, the item taxonomy database 312, and the client descriptive database 314, for example, by a system administrator using the input device 324. In an embodiment, the historical response data 316, the item taxonomy data 318, and the client descriptive data 320 are obtained by downloading such data 316, 318, 320 from an external source. For example, the input device 324 includes a communication interface, as described below, to operatively connect the recommendation system 300 to the external source. The connection of the recommendation system 300 to the external source includes a network connection, such as a connection to a network. The network can be the Internet.

The machine learning module 306 is configured to generate a response probability matrix 322 using the historical response data 316, item taxonomy data 318, and the client descriptive data 320. The recommendation module 308 is configured to receive the response probability matrix 322. The recommendation system 300 also includes the input device 324 configured to receive input data 326. For example, the input data 326 is input by a system administrator through the input device 324 to be stored in the system memory 304. Alternatively, the input data 326 is stored and processed by the system processor 302. In another example, the input data 326 is input by a user to request a recommendation 328 corresponding to an input client or an input item. In a further example, the input data 326 includes system configuration settings.

In an embodiment, the input data 326 includes a recommendation request specifying information about a client or about an item for which a recommendation 328 is to be made. For example, the recommendation request is input by a user through the input device 324. The information about a client or about an item is not limited to previously known items or clients stored in the item taxonomy database 312 or the client descriptive database 314, respectively. The information specifying a client or an item for which a recommendation 328 is to be made can include information about a new client or a new item for which the recommendation 328 is to be made. As described below, using the response probability matrix 322 and the input data 326 corresponding to a recommendation request, the recommendation module 308 generates and outputs the recommendation 328 corresponding to an input client or an input item in the input data 326. The recommendation 328 can have a format selected for a given output device, such as in a text format for conveyance in a text message, in an HTML compliant format for conveyance to a monitor or other format for printing or for machine-to-machine conveyance. Alternatively, the recommendation 328 has any known format or data structure.

In one embodiment, the recommendation 328 is output to an output device to be conveyed in a message to the user. For example, the output device is a display configured to display the message including the recommendation 328. In one embodiment, the display is a monitor. Alternatively, the display is a component of a cellphone such as a smartphone. In another alternative embodiment, the output device is a printer configured to print the message including the recommendation 328 to the user. In a further embodiment, the output device is a speaker configured to generate and output an audio message including the recommendation 328 to the user. As described in greater detail below, the recommendation system 300 generates and outputs the recommendation 328 even in a cold start situation in which a new client or a new item is present in the input data 326 including a recommendation request. In another embodiment, the outputted recommendation 328 is added to client descriptive data 320 associated with a client, such as a new client or an existing client, stored in the client descriptive database 314 as described below, to better inform a future recommendation output by the recommendation system 300. Alternatively, the outputted recommendation 328 is added to the training data used to train the machine learning module 306 to better inform a future recommendation output by the recommendation system 300.

Figure 4:
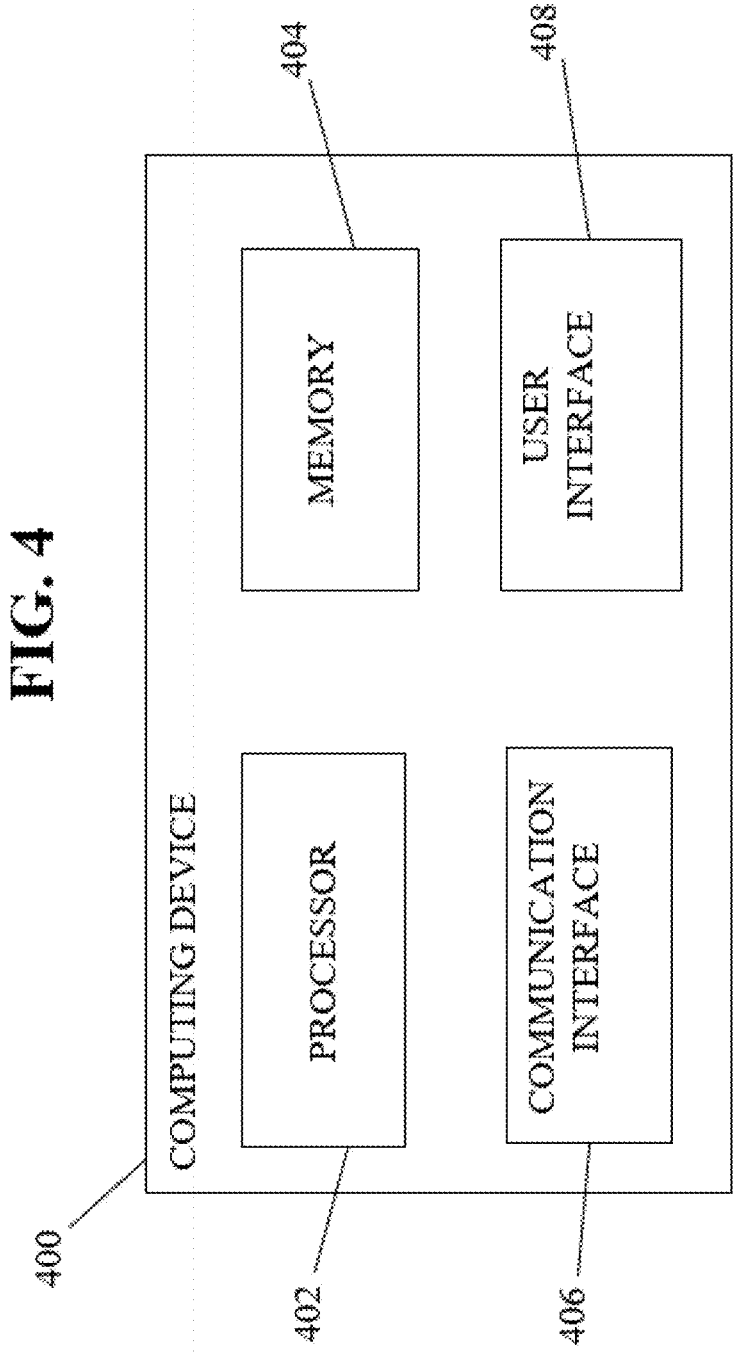
FIG. 4 is a schematic of a computing device used in the embodiment.

FIG. 4 illustrates a schematic of a computing device 400 including a processor 402 having code therein, a memory 404, and a communication interface 406. Optionally, the computing device 400 can include a user interface 408, such as an input device, an output device, or an input/output device. The processor 402, the memory 404, the communication interface 406, and the user interface 408 are operatively connected to each other via any known connections, such as a system bus, a network, etc. Any component, combination of components, and modules of the system 300 in FIG. 3 can be implemented by a respective computing device 400. For example, each of the system processor 302, the system memory 304, the machine learning module 306, the recommendation module 308, and the input device 324 shown in FIG. 3 can be implemented by a respective computing device 400 shown in FIG. 4 and described below.

It is to be understood that the computing device 400 can include different components. Alternatively, the computing device 400 can include additional components. In another alternative embodiment, some or all of the functions of a given component can instead be carried out by one or more different components. The computing device 400 can be implemented by a virtual computing device. Alternatively, the computing device 400 can be implemented by one or more computing resources in a cloud computing environment. Additionally, the computing device 400 can be implemented by a plurality of any known computing devices.

The processor 402 can be a hardware-based processor implementing a system, a sub-system, or a module. The processor 402 can include one or more general-purpose processors. Alternatively, the processor 402 can include one or more special-purpose processors. The processor 402 can be integrated in whole or in part with the memory 404, the communication interface 406, and the user interface 408. In another alternative embodiment, the processor 402 can be implemented by any known hardware-based processing device such as a controller, an integrated circuit, a microchip, a central processing unit (CPU), a microprocessor, a system on a chip (SoC), a field-programmable gate array (FPGA), or an application-specific integrated circuit (ASIC). In addition, the processor 402 can include a plurality of processing elements configured to perform parallel processing. In a further alternative embodiment, the processor 402 can include a plurality of nodes or artificial neurons configured as an artificial neural network. The processor 402 can be configured to implement any known artificial neural network, including a convolutional neural network (CNN).

The memory 404 can be implemented as a non-transitory computer-readable storage medium such as a hard drive, a solid-state drive, an erasable programmable read-only memory (EPROM), a universal serial bus (USB) storage device, a floppy disk, a compact disc read-only memory (CD-ROM) disk, a digital versatile disc (DVD), cloud-based storage, or any known non-volatile storage.

The code of the processor 402 can be stored in a memory internal to the processor 402. The code can be instructions implemented in hardware. Alternatively, the code can be instructions implemented in software. The instructions can be machine-language instructions executable by the processor 402 to cause the computing device 400 to perform the functions of the computing device 400 described herein. Alternatively, the instructions can include script instructions executable by a script interpreter configured to cause the processor 402 and computing device 400 to execute the instructions specified in the script instructions. In another alternative embodiment, the instructions are executable by the processor 402 to cause the computing device 400 to execute an artificial neural network. The processor 402 can be implemented using hardware or software, such as the code. The processor 402 can implement a system, a sub-system, or a module, as described herein.

The memory 404 can store data in any known format, such as databases, data structures, data lakes, or network parameters of a neural network. The data can be stored in a table, a flat file, data in a filesystem, a heap file, a B+ tree, a hash table, or a hash bucket. The memory 404 can be implemented by any known memory, including random access memory (RAM), cache memory, register memory, or any other known memory device configured to store instructions or data for rapid access by the processor 402, including storage of instructions during execution.

The communication interface 406 can be any known device configured to perform the communication interface functions of the computing device 400 described herein. The communication interface 406 can implement wired communication between the computing device 400 and another entity. Alternatively, the communication interface 406 can implement wireless communication between the computing device 400 and another entity. The communication interface 406 can be implemented by an Ethernet, Wi-Fi, Bluetooth, or USB interface. The communication interface 406 can transmit and receive data over a network and to other devices using any known communication link or communication protocol.

The user interface 408 can be any known device configured to perform user input and output functions. The user interface 408 can be configured to receive an input from a user. Alternatively, the user interface 408 can be configured to output information to the user. The user interface 408 can be a computer monitor, a television, a loudspeaker, a computer speaker, or any other known device operatively connected to the computing device 400 and configured to output information to the user. A user input can be received through the user interface 408 implementing a keyboard, a mouse, or any other known device operatively connected to the computing device 400 to input information from the user. Alternatively, the user interface 408 can be implemented by any known touchscreen. The computing device 400 can include a server, a personal computer, a laptop, a smartphone, or a tablet.

Figure 5:
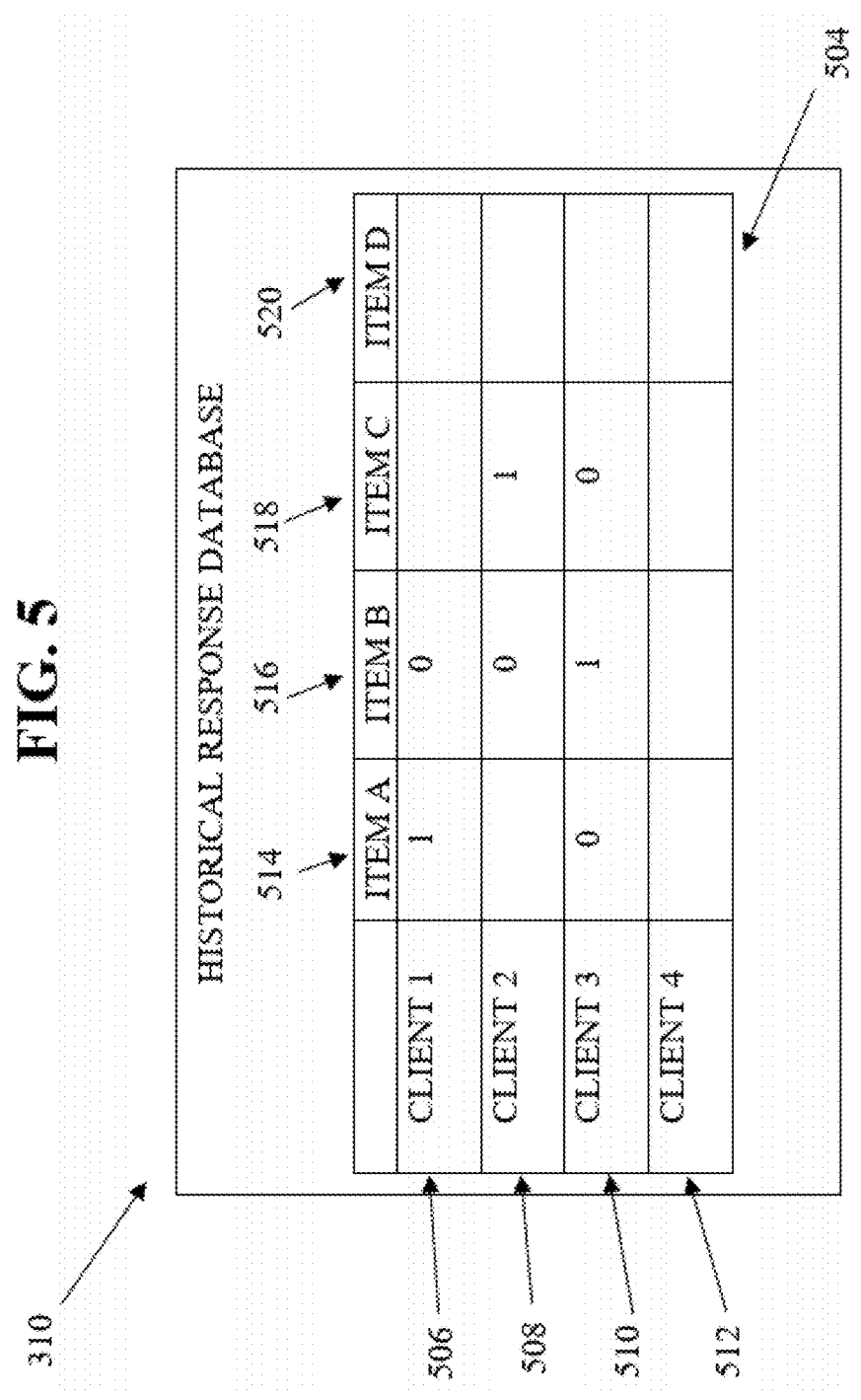
FIG. 5 is a schematic of a historical response database.

Referring to FIG. 5, the historical response database 310 includes a plurality of records configured to store historical responses 504 for clients 506, 508, 510, 512 in relation to items 514, 516, 518, 520. Each of the clients 506, 508, 510, 512 is a user, a consumer, a buyer for an organization, or any known entity for which a recommendation is to be generated. In an example embodiment, each of the clients 506, 508, 510, 512 is indexed as Client 1, Client 2, Client 3, Client 4, respectively. Each of the items 514, 516, 518, 520 is data, numerical values, an idea, a process, a product, a service, an application, a financial value, or any known entity with which a client is involved. In an example embodiment, each of the items 514, 516, 518, 520 is indexed as Item A, Item B, Item C, Item D, respectively. The historical response database 310 is configured to store the historical responses 504 in a table format. Also, the historical response database 310 is configured to store the historical responses 504 in a matrix. Alternatively, the historical response database 310 is configured to store the historical responses 504 in an array. In another alternative embodiment, the historical response database 310 is configured to store the historical responses 504 in any known data structure.

The responses 504 represent interests or predispositions of clients in relation to items, using a predetermined scheme, such as using numerical values, integer values, probabilities ranging from 0 to 1 inclusive, rational values, alphabetical symbols, alphanumerical symbols, or Boolean values. In the example shown in FIG. 5, the responses 504 are represented by numerical values, such as "0" and "1". For example, a "0" indicates that a client is not interested in a given item, such as client 506 as being not interested in Item B. A "1" indicates that a client is interested in a given item, such as client 508 as being interested in Item C. Alternatively, the responses 504 are represented by integer values such as "0", "1", "2", etc., with increasing integer values indicating greater interest in a given item by a client. In another alternative embodiment, the responses 504 are represented by integer values including negative values, such as "−2", "−1", "0", "1", "2", etc., with increasing integer values indicating greater interest in a given item by a client, and decreasing integer values indicating less interest in a given item by a client. In such a predetermined scheme using integer values including negative values, a value of "0" indicates a neutral or lukewarm interest in a given item by a client.

In a further alternative embodiment, the responses 504 are represented by letters or other alphabetical characters, such as "N" representing "no interest", "lack of interest", "negative interest", or "dislike" of a given item by a client, while "Y" for "interest", "great interest", "positive interest", or "like" of a given item by a client. In still another embodiment, the responses 504 are represented by words or other combinations of alphabetical characters, such as "NO" or "NEGATIVE", representing "no interest", "lack of interest", "negative interest", or "dislike" of a given item by a client, while "YES" or "POSITIVE" represent "interest", "great interest", "positive interest", or "like" of a given item by a client. Also, the responses 504 are represented by Boolean values, such as "F" or "FALSE", representing a false state of interest indicating "no interest", "lack of interest", "negative interest", or "dislike" of a given item by a client, while "T" or "TRUE" represent a true state of interest indicating "interest", "great interest", "positive interest", or "like" of a given item by a client.

In still another embodiment, the responses 504 are represented by numerical values in a predetermined range, such as in the range from zero to one, inclusive. Alternatively, the responses 504 are represented by numerical values in a predetermined range, such as in the range from zero to one, exclusive. For example, as described in greater detail below with reference to the response probability matrix 322 shown in FIG. 9, a client 914 has an interest 900 in or a probability of responding to an item 920 represented by 0.77, while a client 916 has an interest 902 in or a probability of responding to an item 924 represented by 0.10. Since 0.77 is greater than 0.10, the client 914 has a greater interest in item 920 than the client 916 has an interest in item 924.

As shown in FIG. 5, the historical response database 310 lacks a response of the client 506 in relation to Item C. In addition, the historical response database 310 lacks a response of the client 508 in relation to item 514. Also, for a new client, such as client 512, the historical response database 310 lacks any responses of the client 512 in relation to any of the items 514, 516, 518. Further, for a new item, such as item D, the historical response database 310 lacks any responses of the clients 506, 508, 510 in relation to the new item D. In addition, for a new client 512 and a new item D, the historical response database 310 lacks any response.

Figure 6:
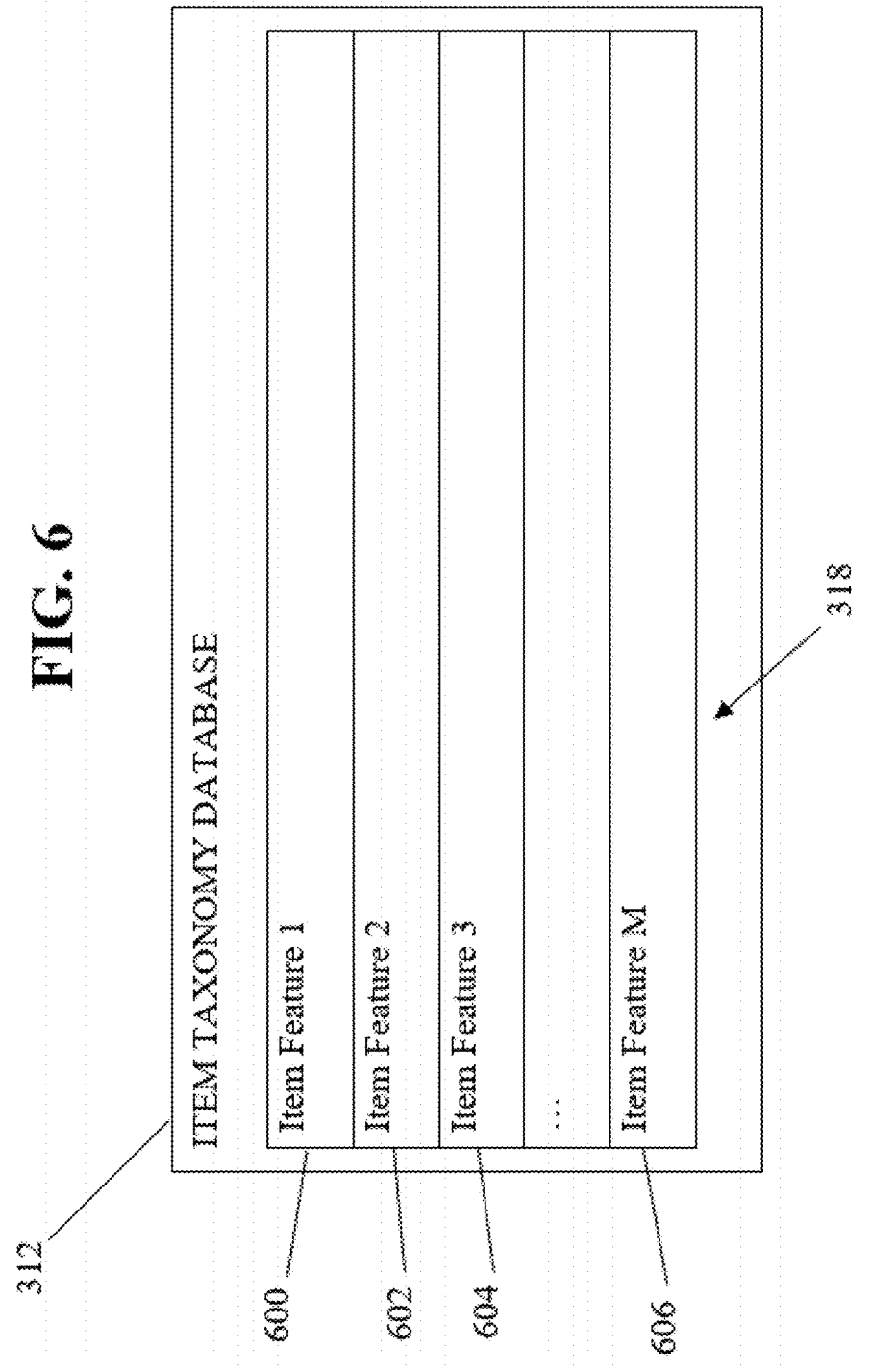
FIG. 6 is a schematic of an item taxonomy database.

Referring to FIG. 6, the item taxonomy database 312 includes a plurality of records configured to store the item taxonomy data 318. The item taxonomy data 318 includes at least one item feature 600, 602, 604, 606, such as item feature 1, item feature 2, item feature 3, to item feature J, respectively. The number of stored item features can be changed or expanded, for example, by a system administrator through the input device 324. A greater number of item features improves performance of the recommendation system 300. Each of the item features 600, 602, 604, 606 includes information associated with a respective item. Each item is data, an idea, a process, a product, a service, an application, a financial value, or any known entity with which a client is involved. The item features 600, 602, 604, 606 also include business objectives, idea themes, calls to action, and product family information. The item taxonomy database 312 is configured to store the item taxonomy data 318 in a table format. Alternatively, the item taxonomy database 312 is configured to store the item taxonomy data 318 in a matrix. In a further alternative embodiment, the item taxonomy database 312 is configured to store the item taxonomy data 318 in an array. In another alternative embodiment, the item taxonomy database 312 is configured to store the item taxonomy data 318 in any known data structure. In a further embodiment, the item taxonomy data 318 is input by a user, such as a system administrator. For example, the item taxonomy data 318 such as the item features 600, 602, 604, 606 are included in the input data 326 entered using the input device 324. In another example, the user populates the item features 600, 602, 604, 606 stored in the item taxonomy database 312 using the input device 324.

In a further example, the user can add to the item features stored in the item taxonomy database 312 using the input device 324. In another example, the user can modify the item features 600, 602, 604, 606 stored in the item taxonomy database 312 using the input device 324. Also, the user can delete item features 600, 602, 604, 606 from the item taxonomy database 312 using the input device 324. Alternatively, the item taxonomy database 312 downloads the item features 600, 602, 604, 606 through the input device 324 from an external source.

Figure 7:
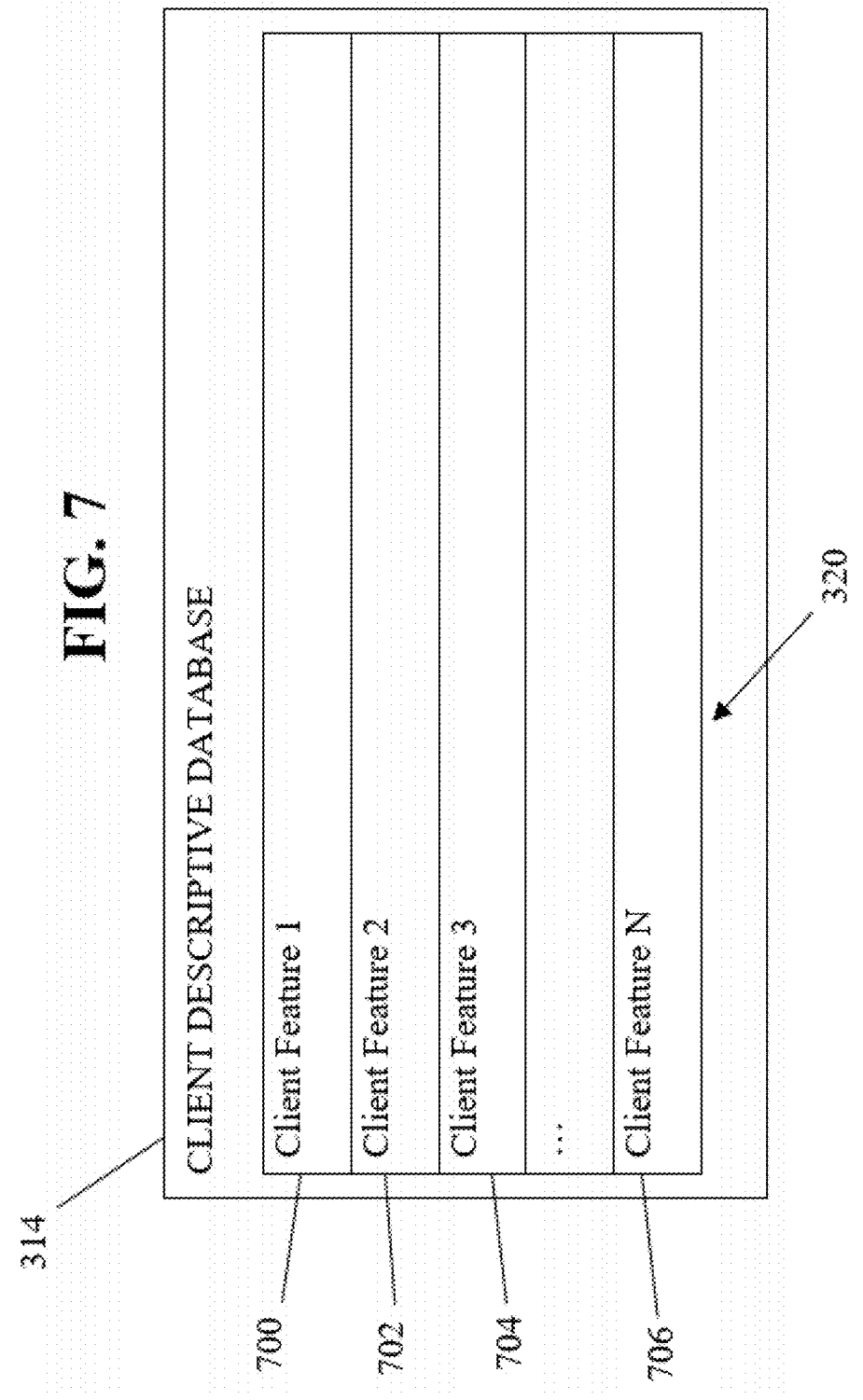
FIG. 7 is a schematic of a client descriptive database.

Referring to FIG. 7, the client descriptive database 314 includes a plurality of records configured to store the client descriptive data 320. The client descriptive data 320 includes at least one client feature 700, 702, 704, 706, such as client feature 1, client feature 2, client feature 3, to client feature K, respectively. The number of stored client features can be changed or expanded, for example, by a system administrator through the input device 324. A greater number of client features improves performance of the recommendation system 300. Each of the client features 700, 702, 704, 706 includes information associated with and describing a respective client. For example, each of the client features 700, 702, 704, 706 includes demographic data, data indicating a client preference, and data indicating responsiveness of a client to marketing campaigns. In addition, the client features 700, 702, 704, 706 includes financial trading data of clients, positions, balances, sales, service interactions, website interactions, and mobile application interactions. The client descriptive database 314 is configured to store the client descriptive data 320 in a table format. Alternatively, the client descriptive database 314 is configured to store the client descriptive data 320 in a matrix. In a further alternative embodiment, the client descriptive database 314 is configured to store the client descriptive data 320 in an array. In another alternative embodiment, the client descriptive database 314 is configured to store the client descriptive data 320 in any known data structure. In a further embodiment, the client descriptive data 320 is input by a user, such as a system administrator. For example, the client descriptive data 320 such as the client features 700, 702, 704, 706 are included in the input data 326 entered using the input device 324. In another example, the user populates the client features 700, 702, 704, 706 stored in the client descriptive database 314 using the input device 324. In a further example, the user can add to the client features 700, 702, 704, 706 stored in the client descriptive database 314 using the input device 324. In another example, the user can modify the client features 700, 702, 704, 706 stored in the client descriptive database 314 using the input device 324. Also, the user can delete client features 700, 702, 704, 706 from the client descriptive database 314 using the input device 324. Alternatively, the client descriptive database 314 downloads the client features 700, 702, 704, 706 through the input device 324 from an external source.

Figure 8:
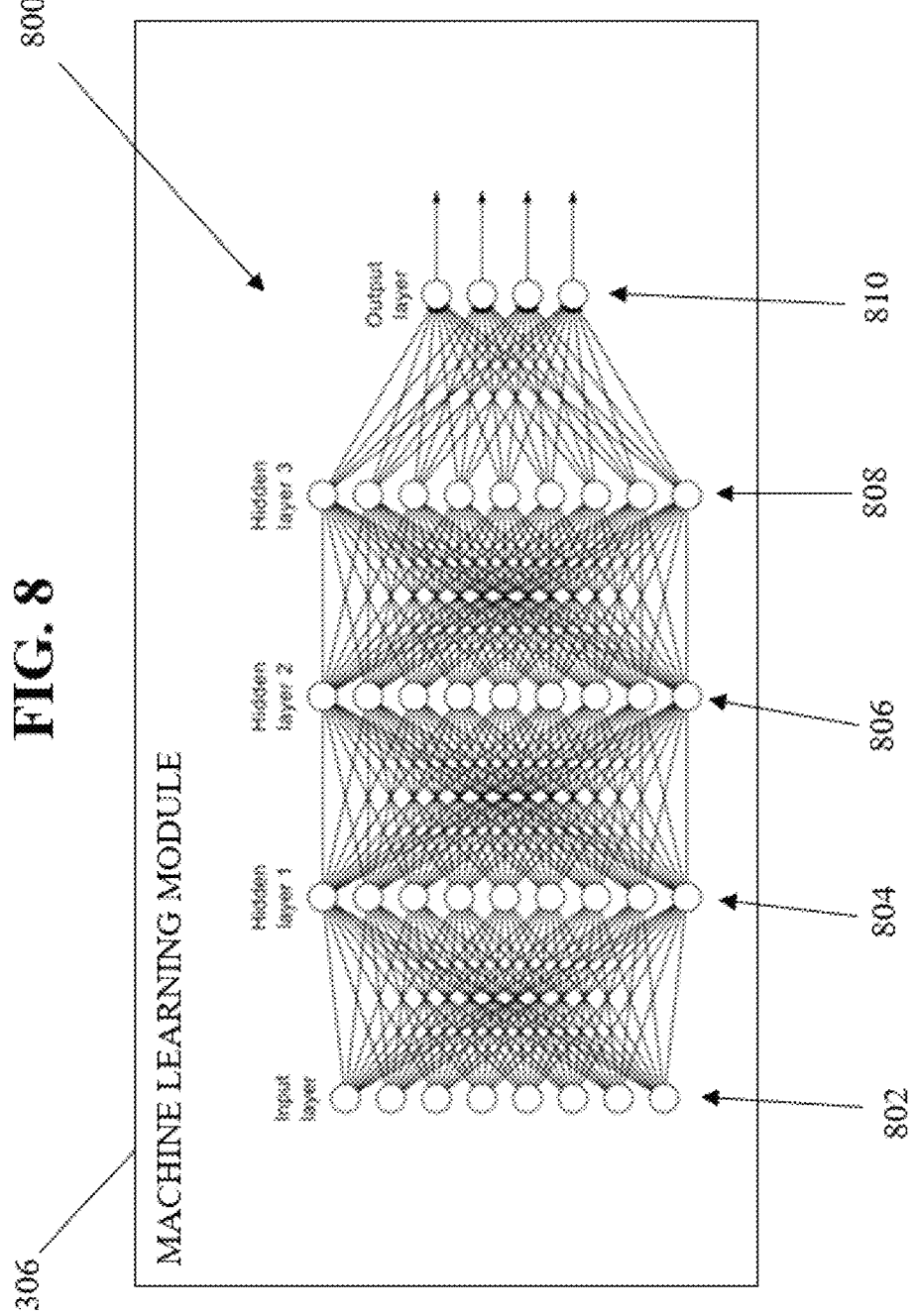
FIG. 8 is a schematic of a machine learning module.

Referring to FIG. 8, in an embodiment, the machine learning (ML) module 306 includes a neural network 800 having a plurality of layers of nodes or artificial neurons. Such layers of nodes or artificial neurons include an input layer 802, at least one hidden layer 804, 806, 808, and an output layer 810. The neural network 800 is trained using known training methods by applying a predetermined training set of data to the input layer 802, adjusting the weights and associations of the nodes or artificial neurons in the at least one hidden layer 804, 806, 808, and generating an output at the output layer 810. For example, the predetermined training set is obtained through the input device 324 from an external source.

In an embodiment, the training method is a supervised learning method. In supervised learning, the predetermined training set of data includes examples of known historical response data 316, examples of known item taxonomy data 318, and examples of known client descriptive data 320, as well as known response probabilities as target outputs. For example, the neural network 800 can be trained by determining a difference between the processed output of the neural network 800 and a target output. The determined difference is an error value. The neural network 800 then adjusts the weights and associations according to a predetermined learning rule, and uses the error value. Successive adjustments by repeated application of the predetermined training data causes the neural network 800 to produce an output that is increasingly similar to the target output. After a sufficient number of successive adjustments, the training of the neural network 800 is terminated based on a predetermined criterion. Alternatively, other known training methods are employed to train the neural network 800, such as unsupervised learning, semi-supervised learning, and reinforcement learning.

In an embodiment, the neural network 800 is a deep learning neural network which employs the neural network 800 as a deep neural network with the plurality of layers of nodes or artificial neurons and using representational learning. Alternatively, the neural network 800 is a deep belief network, a neural network with deep reinforcement learning, a recurrent neural network, a convolutional neural network, or any other known neural network using deep learning. In an alternative embodiment, the machine learning module 306 uses any known machine learning method and components, such as a decision tree, a support vector machine (SVM), a regression analyzer, or a Bayesian network.

During operation of the recommendation system 300, the trained neural network 800 receives the historical response data 316, the item taxonomy data 318, and the client descriptive data 320 at the input layer 802. After processing such data 316, 318, 320, the neural network 800 generates a response probability matrix 322, as described below, and outputs the response probability matrix 322 to the recommendation module 308.

Figure 9:
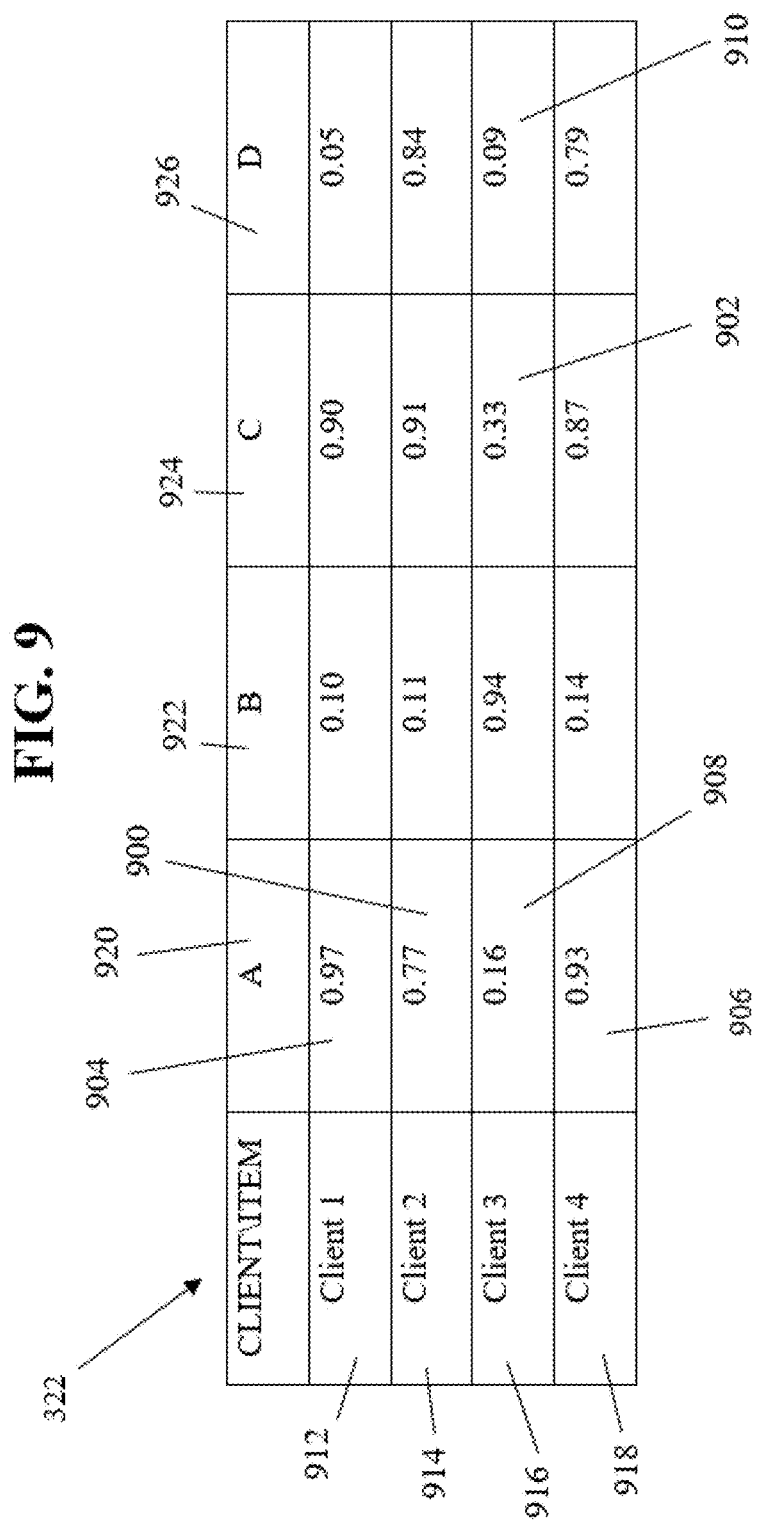
FIG. 9 is a response probability matrix.

Referring to FIG. 9, an example of a response probability matrix 322 includes probabilities 900, 902, 904, 906, 908, 910 of responses for each client-item pair, for the clients 912, 914, 916, 918 and the items 920, 922, 924, 926 labelled A, B, C, and D, respectively. The response probability matrix 322 is stored in the system memory 304. Alternatively, the response probability matrix 322 is stored in a memory of the system processor 302. The response probability matrix 322 is configured to store the probabilities 900, 902, 904, 906, 908, 910 of responses for each client-item pair in a table format. Alternatively, the response probability matrix 322 is configured to store the probabilities 900, 902, 904, 906, 908, 910 of responses for each client-item pair in a matrix. In a further alternative embodiment, the response probability matrix 322 is configured to store the probabilities 900, 902, 904, 906, 908, 910 of responses for each client-item pair in an array. In another alternative embodiment, the response probability matrix 322 is configured to store the probabilities 900, 902, 904, 906, 908, 910 of responses for each client-item pair in any known data structure.

Each of the probabilities 900, 902, 904, 906, 908, 910 of responses for each client-item pair indicates a degree of interest or predisposition of a given client in relation to a given item. For example, as shown in FIG. 9, the client 914 has a probability 900 of 0.77 of having an interest in or responding to the item 920, while the client 916 has a probability 902 of 0.33 of having an interest in or responding to the item 924. Accordingly, since 0.77 is greater than 0.33, the client 914 has a greater interest in or a greater likelihood of responding to the item 920, compared to the client 916 having an interest in or a likelihood of responding to the item 924.

The probabilities 900, 902, 904, 906, 908, 910 in the response probability matrix 322 are generated by the neural network 800, including for new items or new clients. For example, a new item 926 associated with a client 916 has a response probability of 0.09. When compared to the response probabilities of the existing items 920, 922, 924 associated with the client 916, the neural network 800 determines that the item 920 having the response probability of 0.16 is sufficiently similar to the response probability of 0.09 of the new item 926 relative to the client 916, since the respective probability values 0.16 and 0.09 are within a predetermined tolerance or threshold, while the new item 926 is not considered similar to the existing items 922, 924 due to the disparate probabilities of 0.94 and 0.33, respectively, relative to the client 916. In an embodiment, the predetermined tolerance is 0.40. The predetermined tolerance or threshold can be set as a minimum value, so that values below the predetermined tolerance are considered to be the same as zero. Accordingly, probabilities below the predetermined tolerance indicate, for example, a lack of interest. The predetermined tolerance is set, for example, by a system administrator accessing the system processor 302 or the system memory 304 in FIG. 3 using the input device 324. The predetermined tolerance is stored in the system memory 304. Alternatively, the predetermined tolerance is stored in the system processor 302. Accordingly, with respect to the client 916, the new item 926 is most similar to the existing item 920.

Figure 10:
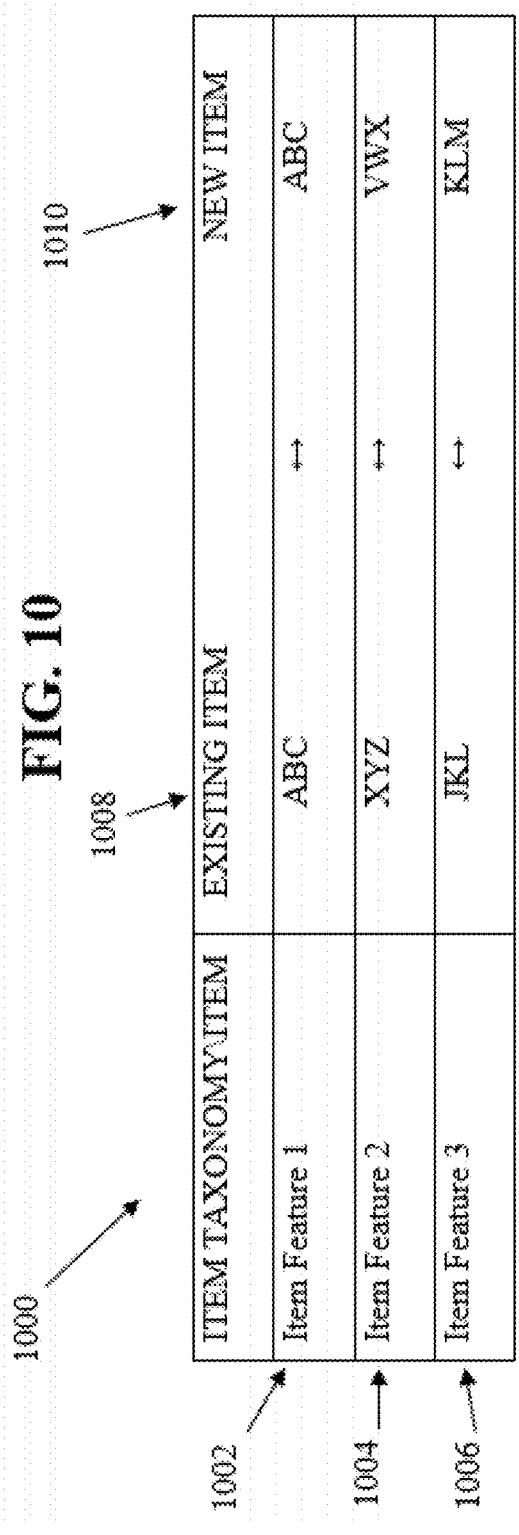
FIG. 10 is a table identifying similar items.

Referring to FIG. 10, during generation of the probabilities 900, 902, 904, 906, 908, 910 in the response probability matrix 322 with respect to new items, the neural network 800 performs a similarity comparison 1000 of item features of existing items in the item taxonomy database 312 to the item features of a new item added to the item taxonomy database 312. In an embodiment, such item features of a new item are added to the item taxonomy database 312 by a system administrator using the input device 324.

Referring to FIG. 10 in conjunction with FIGS. 6 and 9, during the similarity comparison 1000, for example, the neural network 800 compares the item features 1002, 1004, 1006 for an existing item 1008 and for a new item 1010. In an example, the items 1008, 1010 are products with components. For item feature 1002, both of the existing item 1008 and the new item 1010 have components A, B, and C. Accordingly, the new item 1010 has 100% similarity with the existing item 1008 relative to the item feature 1002.

For item feature 1004, the existing item 1008 has components X, Y, and Z, while the new item 1010 has components V, W, and X. By having one component X in common out of three components, the existing item 1008 and the new item have 33.33% similarity relative to the item feature 1004. For item feature 1006, the existing item 1008 has components J, K, and L, while the new item 1010 has components K, L, and M. By having two components K and L in common out of three components, the existing item 1008 and the new item have 66.66% similarity relative to the item feature 1006. Based on the determined similarities in properties such as product components as item features 1002, 1004, 1006 having 100% similarity, 33.33% similarity, and 66.66% similarity, respectively, the neural network 800 determines that the new item 1010 is sufficiently similar to the existing item 1008.

In an alternative embodiment, the neural network 800 can weight a given item feature as being more significant than other item features. For example, referring to FIG. 10, the item feature 1002 is weighted to have higher significance than the item features 1004, 1006. Accordingly, the 100% similarity of the new item 1010 to the existing item 1008 with respect to the item feature 1002 is given greater weight than the similarities of new item 1010 to the existing item 1008 with respect to the item features 1004, 1006.

Furthermore, the probabilities 900, 902, 904, 906, 908, 910 in the response probability matrix 322 are also generated by the neural network 800 which performs a similarity comparison of client features of existing clients to the client features of a new client.

For example, referring to FIG. 9, a new client 918 associated with an item 920 has a response probability of 0.93. When compared to the response probabilities of the existing clients 912, 914, 916 associated with the item 920, the neural network 800 determines that the client 913 having the response probability of 0.97 is sufficiently similar to the response probability of 0.93 of the new client 918 relative to the item 920, since the respective probability values 0.93 and 0.97 are within the predetermined tolerance or threshold, while the new client 918 is not considered similar to the existing clients 914, 916 due to the disparate probabilities of 0.77 and 0.16, respectively, relative to the item 920. In an embodiment, the predetermined tolerance is 0.10. Accordingly, with respect to the item 920, the new client 918 is most similar to the existing item 912.

Figure 11:
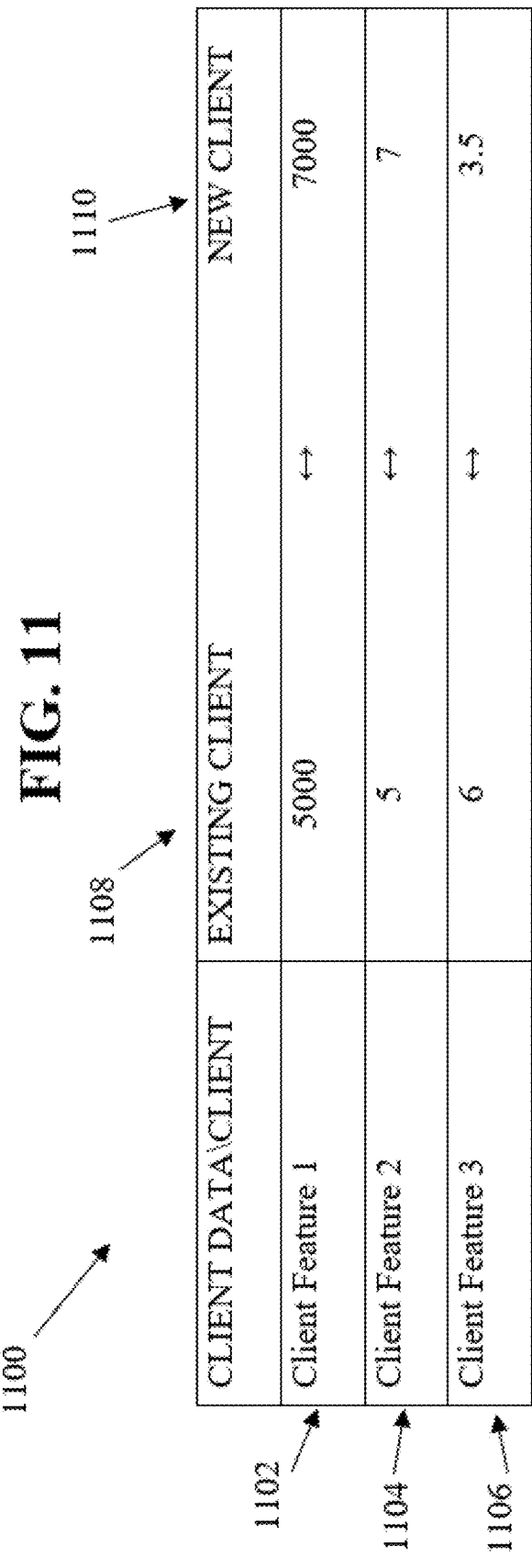
FIG. 11 is a table identifying similar clients.

Referring to FIG. 11, during generation of the probabilities 900, 902, 904, 906, 908, 910 in the response probability matrix 322 with respect to new clients, the neural network 800 performs a similarity comparison 1100 of client features of existing clients in the client descriptive database 314 to the client features of a new client added to the client descriptive database 314. In an embodiment, such client features of a new client are added to the client descriptive database 314 by a system administrator using the input device 324.

Referring to FIG. 11 in conjunction with FIGS. 7 and 9, during the similarity comparison 1100, for example, during generation of the probabilities 900, 902, 904, 906, 908, 910 in the response probability matrix 322 with respect to new clients, the neural network 800 performs the similarity comparison 1100 of client features of existing clients to the client features of a new client. For example, referring to FIG. 11 in conjunction with FIGS. 7 and 9, the neural network 800 compares the client features 1102, 1104, 1106 for an existing client 1108 and for a new client 1110. In an example, the clients 1108, 1110 are financial institutions. For client feature 1102, the existing client 1108 has 5,000 employees and the new client 1110 has 7,000 employees. Accordingly, the new client 1110 has 40% similarity with the existing client 1108 relative to the client feature 1102.

For client feature 1104, the existing client 1108 has five financial programs, such as mutual funds or certificates of deposit (CDs), while the new client 1110 has seven financial programs. Accordingly, the existing client 1108 and the new client have 40% similarity relative to the client feature 1104. For client feature 1106, the existing client 1108 has interest rates at 6%, while the new client 1110 has interest rates at 3.5%. Accordingly, the existing client 1108 and the new client have 41.66% similarity relative to the client feature 1106. Based on the determined similarities in properties of financial institutions as client features 1102, 1104, 1106 having 40% similarity, 40% similarity, and 41.66% similarity, respectively, the neural network 800 determines that the new client 1110 is sufficiently similar to the existing client 1108.

In an alternative embodiment, the neural network 800 can weight a given client feature as being more significant than other client features. For example, referring to FIG. 11, the client feature 1104 corresponding to the number of financial programs is weighted to have higher significance than the client features 1102, 1106. Accordingly, the 40% similarity of the new client 1110 to the existing client 1108 with respect to the client feature 1104 is given greater weight than the similarities of new client 1110 to the existing client 1108 with respect to the client features 1102, 1106.

Figure 12:
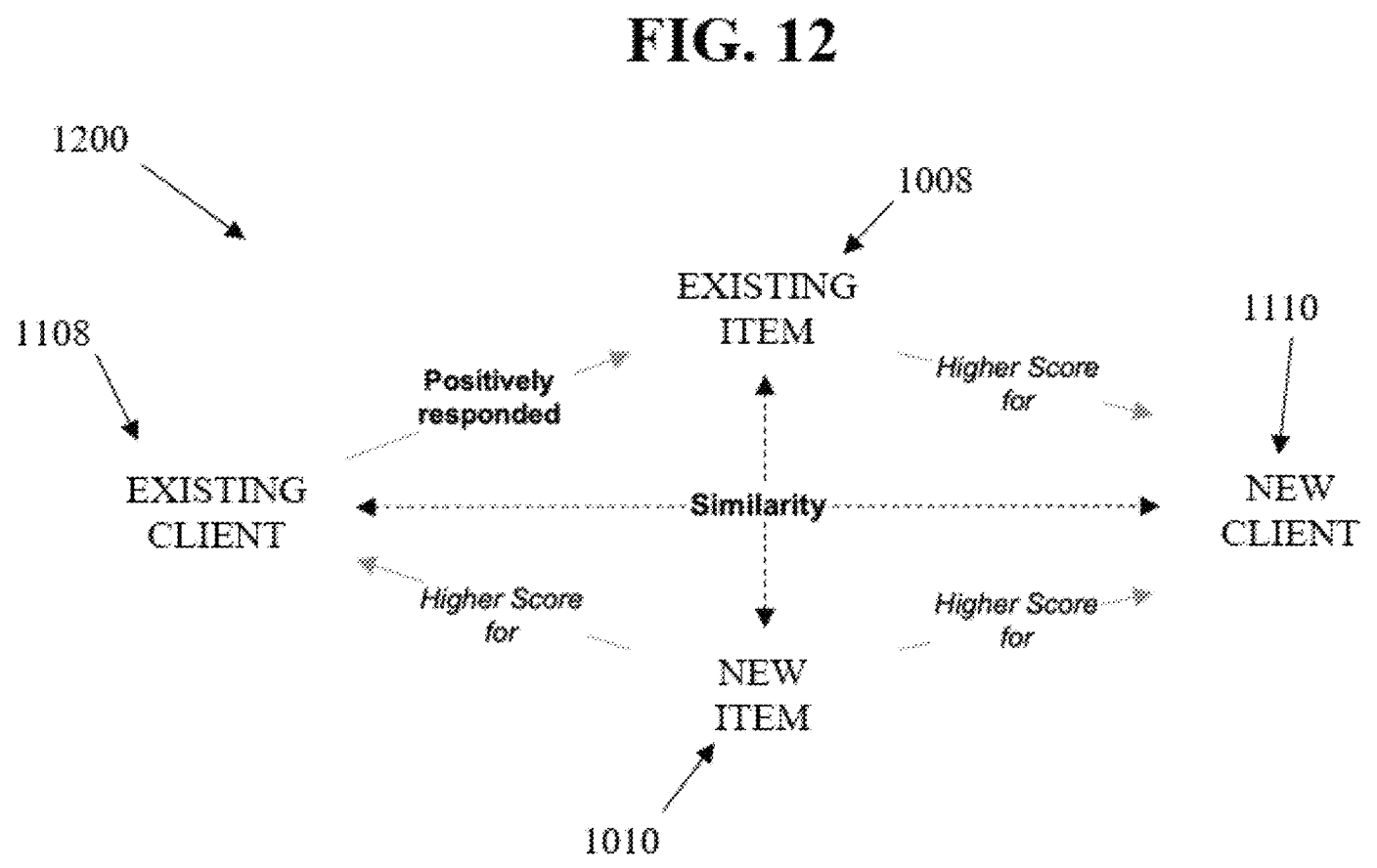

Referring to FIG. 12 in conjunction with FIGS. 8-11, a graph 1200 includes the existing item 1008, the new item 1010, the existing client 1108, and the new client 1110 as nodes or vertices. The graph 1200 illustrates the relationships between the existing item 1008, the new item 1010, the existing client 1108, and the new client 1110. For example, in the case that the existing client 1108 positively responded to the existing item 1008, a corresponding response probability in the response probability matrix 322 between the existing client 1108 and the existing item 1008 is relatively high. Based on the similarities established by the neural network 800 between the existing item 1008 and the new item 1010, and between the existing client 1108 and the new client 1110, as described above, higher probabilities or scores between the existing item 1008 and the new client 1110, between the new item 1010 and the existing client 1108, and between the new item 1010 and the new client 1110 are established. Accordingly, the neural network 800 fills out the response probability matrix 322 to include the client-item pairs, even when new clients and new items are included in the input data 326.

Referring to FIG. 13, a method 1300 of operation of the recommendation system 300 includes training the machine learning module 306 using a predetermined training set of historical responses to recommendation requests, item taxonomy data, and client descriptive data in step 1302. The method 1300 further includes generating the response probability matrix 322 in step 1304 using the historical responses 316 to recommendation requests, using the item taxonomy data 318, and using the client descriptive data 320 applied to the trained machine learning module 306. The method 1300 then receives, through the input device 324, a user request for a recommendation including input item data or input client data as the input data 326 in step 1306. The method 1300 applies the response probability matrix 322 to the input item data or input client data in the input data 326 to generate the recommendation 328 using the recommendation module 308 with the recommendation 328 corresponding to the user request in step 1308. The method 1300 then outputs the recommendation 328 to the user in step 1310.

Figure 14:
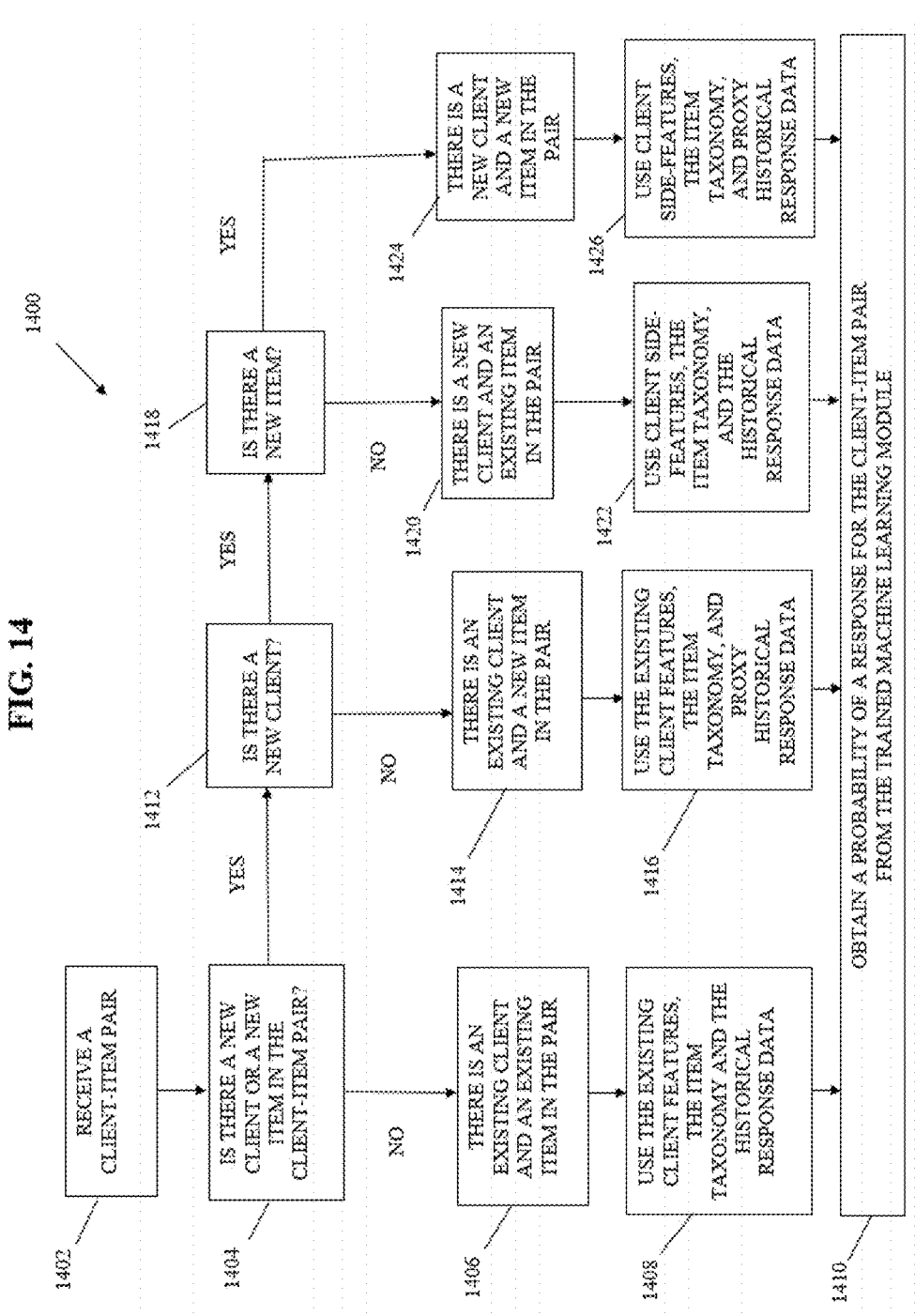
FIG. 14 is a flowchart of a decisioning process used by the recommendation system of FIG. 3.

Referring to FIG. 14, a decisioning process 1400 is illustrated with which the trained machine learning module 306, using the trained neural network 800, evaluates and processes the item taxonomy data 318 and the client descriptive data 320 to determine the status of each client-item pair, and to obtain a probability of a response for each client-item pair to populate the response probability matrix 322 for the client-item pairs. As shown in FIG. 14, the decisioning process 1400 includes the step 1402 of receiving a client-item pair, and determining if there is a new client or a new item in the client-item pair in step 1404. If not, then the decisioning process 1400 determines that there is an existing client and an existing item in the client-item pair in step 1406. The trained machine learning module 306 uses the existing client features in the client descriptive data 320, the item taxonomy data 318, and the historical response data 316 in step 1408 to obtain a probability of a response for the client-item pair from the trained machine learning module 306 in step 1410.

Referring back to setup 1404, if there is a new client or a new item in the client-item pair in step 1404, the decisioning process 1400 determines if there is a new client in step 1412. If not, then the decisioning process 1400 determines that there is an existing client and a new item in the client-item pair in step 1414. The trained machine learning module 306 uses the existing client features in the client descriptive data 320, the item taxonomy data 318, and proxy historical response data stored in the historical response database 310 in step 1416 to obtain a probability of a response for the client-item pair from the trained machine learning module 306 in step 1410.

Figure 1:
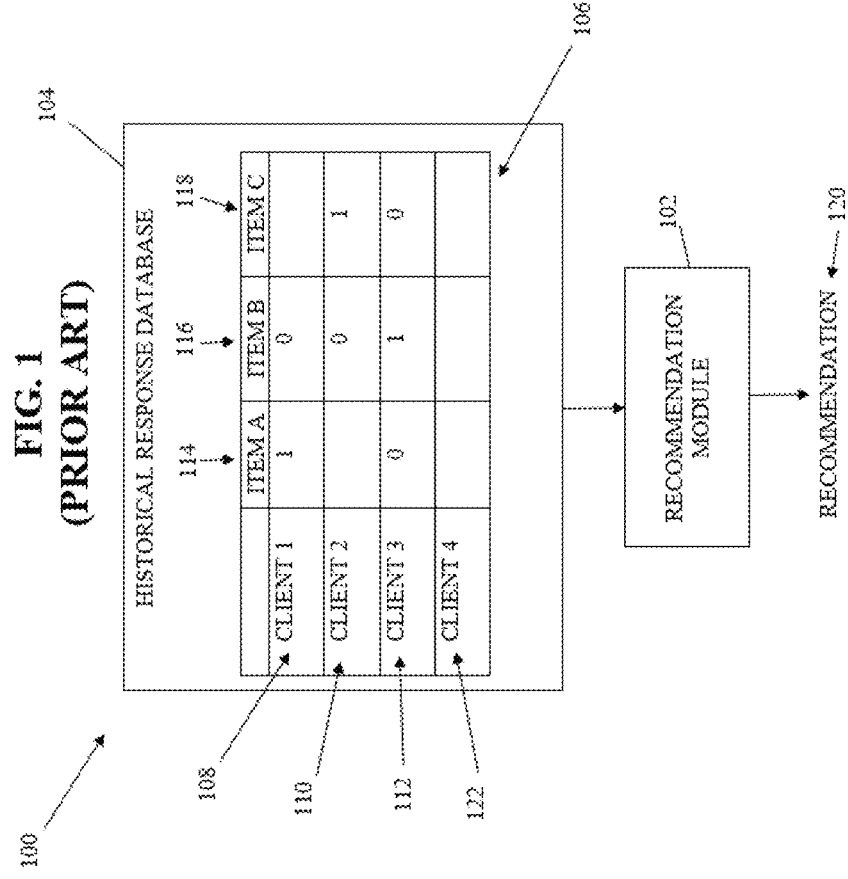
FIG. 1 is a schematic of a recommendation system in the prior art.
Figure 2:
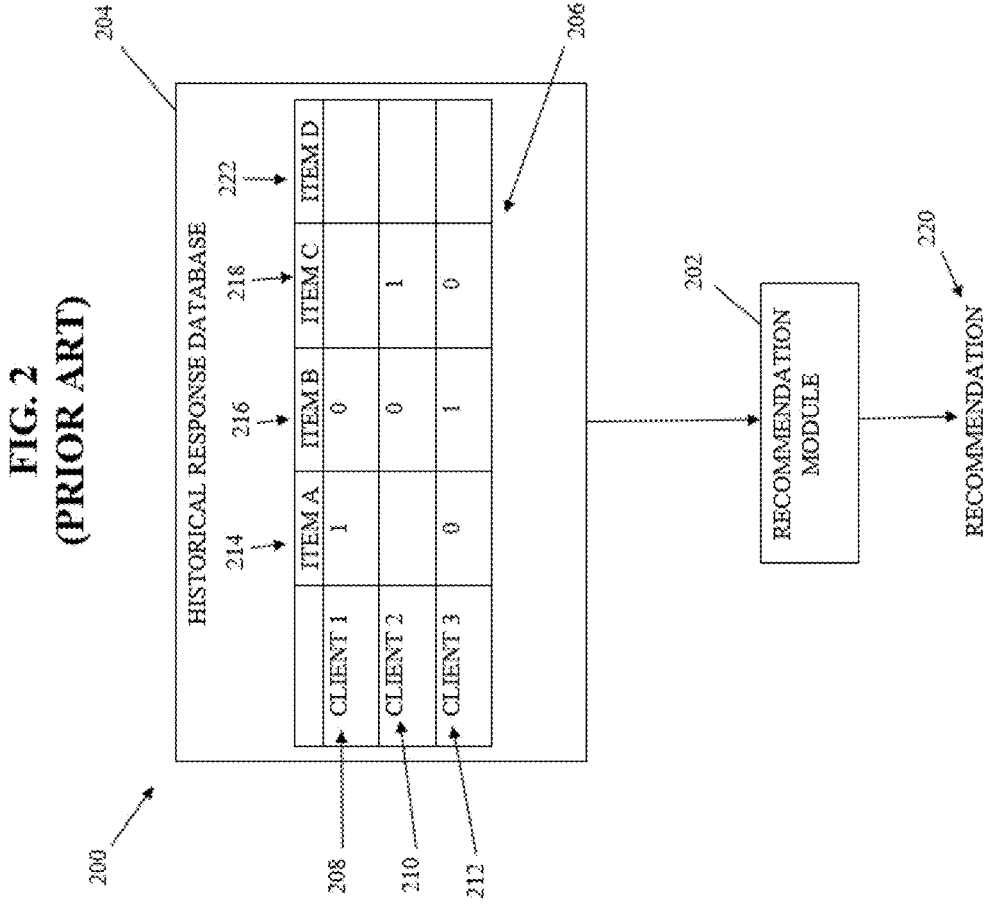
FIG. 2 is a schematic of an alternative recommendation system in the prior art.

The proxy historical response data is past interaction data created to complete the historical response database 310. As shown in FIGS. 1-2, the historical response data 106, 206 in the prior art is incomplete even though the clients 108, 110, 112 and the items 114, 116, 118 in FIG. 1, and the clients 208, 210, 212 and the items 214, 216, 218 in FIG. 2 are not new clients or items, respectively.

The recommendation system 300 is configured to remedy any incomplete historical response data 316 using the machine language module 306. The machine language module 306 generates proxy historical data or substitutes by mapping an item planned for recommendation to all historical campaigns, such as marketing campaigns, conducted for the exact same item which is conducted for standalone campaigns. For each item which does not have an exact corresponding item presented in historical campaigns, the recommendation system 300 identifies a close proxy of a product or campaign. For example, the opening of a brokerage account is a proxy for opening a virtual advisory account. In another example, newsletter content is a proxy to webinar content. Using proxy historical response data generated by the machine language module 306, the recommendation system 300 has an increased performance to generate and output a recommendation 328.

Referring back to step 1412, there is a new client, and the decisioning process 1400 determines if there is a new item in step 1418. If not, then the decisioning process 1400 determines that there is a new client and an existing item in the client-item pair in step 1420. The trained machine learning module 306 uses client side-features stored in the current descriptive database 314, the item taxonomy data 318, and historical response data stored in the historical response database 310 in step 1422 to obtain a probability of a response for the client-item pair from the trained machine learning module 306 in step 1410. For example, the client side-features can include internal data which an organization has collected about a client, as well as potentially third-party data or self-reported data from the client. The client side-features can be obtained and stored by the recommendation system 300 from external databases or other sources of the internal data, third-party data, or self-reported data. For example, the input data 326 include the client side-features, and received by the input device 324 in FIG. 3.

Referring back to step 1418, there is a new client and a new item in the pair in step 1424, and the trained machine learning module 306 uses client side-features stored in the client descriptive database 314, the item taxonomy data 318, and proxy historical response data stored in the historical response database 310 in step 1426 to obtain a probability of a response for the client-item pair from the trained machine learning module 306 in step 1410.

Using the recommendation system 300, the cold start situation is addressed, allowing the recommendation module 308 to generate and output a recommendation 328 even in a cold start situation in which a new client or a new item is present in the input data 326 including a recommendation request. Accordingly, the recommendation system 300 predicts which clients have a preferred response to a new item which was not historically presented, and predicts which items that a new client preferably responds to given that the client is new and does not have any history of interactions. The recommendation system 300 also prioritizing one item over another as all historical campaigns are carried out in silos to a non-comparable target group. In addition, the recommendation system 300 continuously learns from recommendations and the responses to improve the effectiveness of the recommendation system 300 and the recommendation module 308.

The recommendation system 300 presents and prioritizes multiple items for clients, and introduces a new item and identifies clients which have a higher probability of a preferred response without the need of running a test and learn campaign to gather data. In addition, the recommendation system 300 provides a faster time to market for any new item, and offers a differentiated client experience as the machine learning module 306 continuously learns a preference of a client and adjusts a presentation of items. With the recommendation system 300, multiple campaigns are run simultaneously, including the ability to conduct omni-channel campaigns. In addition, targeting models are continuously optimized, leveraging the deep learning neural network of the machine learning module 306 to rank propensities across products. The recommendation system 300 facilitates scaled personalization, and has the ability to present personalized preference items even for new clients.

Portions of the methods described herein can be performed by software or firmware in machine readable form on a tangible (e.g., non-transitory) storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A recommendation system, comprising:

an input device configured to receive input data including an existing client feature corresponding to an existing client, and a new client feature corresponding to a new client;

a hardware-based processor;

a memory configured to store instructions, configured to provide the instructions to the hardware-based processor, and configured to store item taxonomy data for at least one item, to store client descriptive data for the existing client, and to store historical response data for at least one item responded to by the existing client, wherein the item taxonomy data includes an item feature of an existing item, wherein the client descriptive data includes the existing client feature of the existing client, and wherein the memory does not store historical response data for the new client; and a set of modules configured to implement the instructions provided to the hardware-based processor, the set of modules including:

a machine learning module configured to generate a response probability matrix using the historical response data, the item taxonomy data, and the client descriptive data, wherein the response probability matrix includes a probability of a response of the existing client or the new client to the at least one item, and wherein the probability of the response in the response probability matrix in the case of the new client is generated using the machine learning module performing a first similarity comparison of the existing client feature of the existing client in the client descriptive data to the new client feature of the new client; and a recommendation module configured to generate and output a relevant recommendation of the at least one item corresponding to input data of the existing client or the new client using the response probability matrix, wherein in the case of the new client, the recommendation module generates and outputs the relevant recommendation of the at least one item for the new client without any historical response data for the new client, thereby performing a cold start for generating and outputting the relevant recommendation for the new client.

2. The recommendation system of claim 1, wherein the input data includes item data.

3. The recommendation system of claim 2, wherein the item data is selected from the group consisting of: a numerical value, an idea, a process, a product, a service, an application, and a financial value.

4. The recommendation system of claim 1, wherein the machine learning module includes a neural network.

5. The recommendation system of claim 4, wherein the neural network is a deep neural network including a plurality of nodes arranged in a plurality of layers of nodes.

6. The recommendation system of claim 4, wherein the neural network is trained from a training set including the historical response data, the item taxonomy data, the client descriptive data, and probabilities as target outputs associated with the historical response data, the item taxonomy data, and the client descriptive data.

7. The recommendation system of claim 1, wherein the machine learning module performs the first similarity comparison using a first threshold.

8. The recommendation system of claim 1, wherein the memory does not initially store historical response data for the new client.

9. The recommendation system of claim 1, wherein the at least one item is a new item.

10. A recommendation system, comprising:

an input device configured to receive input data including an existing client feature corresponding to an existing client, and a new client feature corresponding to a new client;

a hardware-based processor;

a memory configured to store instructions, configured to provide the instructions to the hardware-based processor, and configured to store item taxonomy data for at least one item, to store client descriptive data for the existing client, and to store historical response data for at least one item responded to by the existing client, wherein the item taxonomy data includes an item feature of an existing item, wherein the client descriptive data includes the existing client feature of the existing client, and wherein the memory does not store historical response data for the new client; and a set of modules configured to implement the instructions provided to the hardware-based processor, the set of modules including:

a trained machine learning module configured to generate a response probability matrix using the historical response data, the item taxonomy data, and the client descriptive data, wherein the response probability matrix includes a probability of a response of the existing client or the new client to the at least one item, and wherein the probability of the response in the response probability matrix in the case of the new client is generated using the trained machine learning module performing a first similarity comparison of the existing client feature of the existing client in the client descriptive data to the new client feature of the new client; and a recommendation module configured to generate and output a relevant recommendation of the at least one item corresponding to the input data of the existing client or the new client using the response probability matrix, wherein in the case of the new client, the recommendation module generates and outputs the relevant recommendation of the at least one item for the new client without any historical response data for the new client, thereby performing a cold start for generating and outputting the relevant recommendation for the new client.

11. The recommendation system of claim 10, wherein the input data includes item data.

12. The recommendation system of claim 11, wherein the item data is selected from the group consisting of: a numerical value, an idea, a process, a product, a service, an application, and a financial value.

13. The recommendation system of claim 10, wherein the machine learning module includes a neural network.

14. The recommendation system of claim 13, wherein the neural network is a deep neural network including a plurality of nodes arranged in a plurality of layers of nodes.

15. The recommendation system of claim 13, wherein the neural network is trained from a training set including the historical response data, the item taxonomy data, the client descriptive data, and probabilities as target outputs associated with the historical response data, the item taxonomy data, and the client descriptive data.

16. The recommendation system of claim 10, wherein the trained machine learning module performs the first similarity comparison using a first threshold.

17. The recommendation system of claim 10, wherein the memory does not initially store historical response data for the new client.

18. The recommendation system of claim 10, wherein the at least one item is a new item.

19. A computer-based method, comprising:

providing a hardware-based processor, a memory, and a set of modules, wherein the memory is configured to store instructions, configured to provide the instructions to the hardware-based processor, and configured to store item taxonomy data for at least one item, to store client descriptive data for an existing client, and to store historical response data for at least one item responded to by the existing client, and the set of modules is configured to implement the instructions provided to the hardware-based processor, the set of modules including a trained machine learning module and a recommendation module;

receiving input data including an existing client feature corresponding to the existing client, and a new client feature corresponding to a new client;

storing, in the memory, item taxonomy data for at least one item wherein the item taxonomy data includes an item feature of an existing item, client descriptive data for the existing client wherein the client descriptive data includes the client feature of the existing client, and historical response data for the at least one item responded to by the existing client, and wherein the memory does not store historical response data for the new client;

generating a response probability matrix by the trained machine learning module using the historical response data, the item taxonomy data, and the client descriptive data, wherein the response probability matrix includes a probability of a response of the existing client or the new client to the at least one item, including:

in the case of the new client, performing a first similarity comparison, using the trained machine learning module, of the existing client feature of the existing client in the client descriptive data to the client feature of the new client; and in the case of the new client, generating the probability of the response in the response probability matrix for the new client using the first similarity comparison;

receiving a recommendation request for a relevant recommendation of the at least one item for the existing client or the new client;

generating, using the recommendation module, the relevant recommendation corresponding to the recommendation request using the response probability matrix, wherein in the case of a new client, generating the relevant recommendation of the at least one item for the new client is performed without any historical response data for the new client, thereby performing a cold start for generating the relevant recommendation for the new client; and outputting the relevant recommendation from the recommendation module.

20. The computer-based method of claim 19, wherein the machine learning module is trained from a training set including the historical response data, the item taxonomy data, the client descriptive data, and probabilities as target outputs associated with the historical response data, the item taxonomy data, and the client descriptive data.

* * * * *